United States Patent [19]

Cox

[11] 3,956,772
[45] May 18, 1976

[54] CONTROL SYSTEM FOR PRE-INFLATION OF PILOT'S G-SUIT

[75] Inventor: Lyndon S. Cox, Silver Spring, Md.

[73] Assignee: The United States of America as represented by the Secretary of the Army, Washington, D.C.

[22] Filed: July 11, 1975

[21] Appl. No.: 595,210

[52] U.S. Cl. .............................. 2/2.1 A; 251/129; 244/122 R; 244/83 R
[51] Int. Cl.² ........................................ B64D 25/02
[58] Field of Search ................ 244/122 R, 83 R, 78; 137/45, 46; 251/129

[56] References Cited
UNITED STATES PATENTS

| | | | |
|---|---|---|---|
| 3,514,056 | 5/1970 | Camillo | 244/78 |
| 3,792,426 | 2/1974 | Ravenelle et al. | 2/2.1 A |

Primary Examiner—Arnold Rosenthal
Attorney, Agent, or Firm—Nathan Edelberg; Robert P. Gibson; Saul Elbaum

[57] ABSTRACT

In an electronic version of the present invention, the potentiometer is connected to an aircraft control stick for sensing the position thereof. The output is coupled to logic circuits that detect the position of the control stick, associated with a severe maneuver about the pitch axis. Such detection actuates a valve for preinflation of a G-suit. Additional logic circuits are provided for detecting when the rate of control stick movement exceeds a preselected threshold. This, also corresponds with a severe maneuver about the pitch axis of the aircraft and also serves to actuate the G-suit valve. Analogous fluidic components may be utilized to effectuate equivalent operation of the G-suit.

8 Claims, 2 Drawing Figures

CONTROL SYSTEM FOR PRE-INFLATION OF PILOT'S G-SUIT

RIGHTS OF THE GOVERNMENT

The invention described herein may be manufactured, used, and licensed by the United States Government for governmental purposes without the payment to me of any royalty thereon.

FIELD OF THE INVENTION

The present invention relates to pressurized protective wear for pilots, and more particularly to a control system for pre-inflating a G-suit.

BRIEF DESCRIPTION OF THE PRIOR ART

For many years, pilots have worn protective pressurized suits, known as G-suits which exert pressure upon a pilot's lower extremities during severe maneuvers around the pitch axis. This is necessary because lack of such protection causes a pilot's blood to "pool" in his lower extremities, due to severe G forces exerted on his body during such maneuvers. In the past, the inflation of a conventional G-suit has been achieved by mechanical means that are responsive to the G forces exerted on the aircraft. Usually, such mechanical devices include G-suit valve actuators which include springs that are responsive to the G forces. However, as will be appreciated, a lack of response is inherent with such mechanical actuators. As a result, during severe, high speed maneuvers around the pitch axis, the "pooling" of a pilot's blood may occur before inflation of his G-suit is effected. Then blood is drained from the pilot's head thereby making blackouts a distinct possibility. Further, with the utilization of the prior art mechanical valve actuators, the inflation occurs after pooling results and as a result of pressure on the lower extremities, the pilot's blood cannot be redistributed to the brain. The concept of pre-inflation, that is rapid inflation of a G-suit, was developed by others, in years past. However, the applicant is unaware of any successful control systems for accomplishing pre-inflation of a G-suit in direct response to pilot control manipulation so that a pilot's G-suit may be inflated prior to the time that an aircraft completely responds to the control manipulation.

BRIEF DESCRIPTION OF THE PRESENT INVENTION

The present invention is directed to the instrumentation of a control system for a G-suit that accomplishes pre-inflation of the suit while a pilot manipulates his controls, and prior to a complete response of an aircraft to such manipulation. The invention utilizes commercially available components that have been arranged in a novel and simple combination for maximizing reliability and minimizing cost. Although a preferred embodiment of the present invention is described in terms of electronic components, it is to be emphasized that the system may be implemented, in accordance with the abilities of one of ordinary skill in the art, with conventional and available fluidic components.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
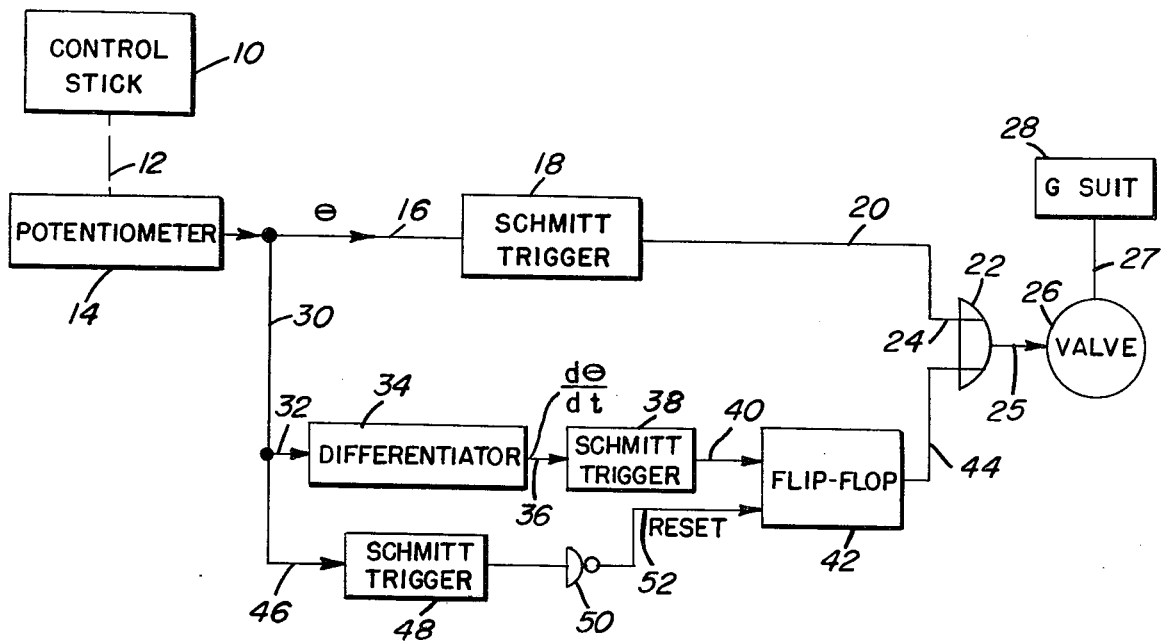
FIG. 1 is a block diagram of the electrical control system for the present invention.

Referring to the figures, and more particularly FIG. 1 thereof, the present invention utilizes a conventional aircraft control stick 10 that is mechanically linked (12) to a conventional rotational potentiometer 14 for developing an analog signal along line 16 that represents the angular position of the control stick 10. The analog signal along lead 16 drives a Schmitt trigger 18 for developing a logic output along the output line 20, thereof when the voltage along line 16 exceeds a preselected threshold level. When the Schmitt trigger 18 is activated, a binary 1 logic level will appear at the input 24 of OR gate 22. As a result, a binary 1 output appears at line 25 for actuating a conventional valve 26 which may be classified as a solenoid valve. The valve 26, upon actuation by the input at 25 permits the passage of gas flow through the output of the valve, at 27. This gas flow is utilized to inflate a conventional and commercially available G-suit 28.

Thus, by sensing the position of a control stick, and determining when the position is indicative of a severe maneuver about an aircraft pitch axis, pre-inflation of the G-suit 28 occurs thereby preventing the pooling of blood in the lower extremities of a pilot.

The remainder of the system, as depicted in FIG. 1, is directed to a dynamic detection, namely, the detection of a rapid speed of movement of the control stick, again indicative of a severe maneuver about the pitch axis.

A second line 30 is connected to the output of potentiometer 14 for providing analog information of the position of the control stick 10 to the input 32 of a conventional analog differentiator 34. The output 36 of the differentiator provides the derivative of angular information or the speed of movement of the control stick 10. This information is furnished to a second Schmitt trigger 38 which provides an input, along line 40 to a flip-flop 42. Upon exceeding a preselected threshold level for the Schmitt trigger, the flip-flop 42 is set and provides a binary 1 logic level, along line 44 to the previously mentioned OR gate 22. This then effects the pre-inflation of the G-suit 28 as previously described. Thus, by either or simultaneous inputs to the OR gate 22 from Schmitt trigger 18 or flip-flop 42, the G-suit will undergo pre-inflation.

Figure 2:
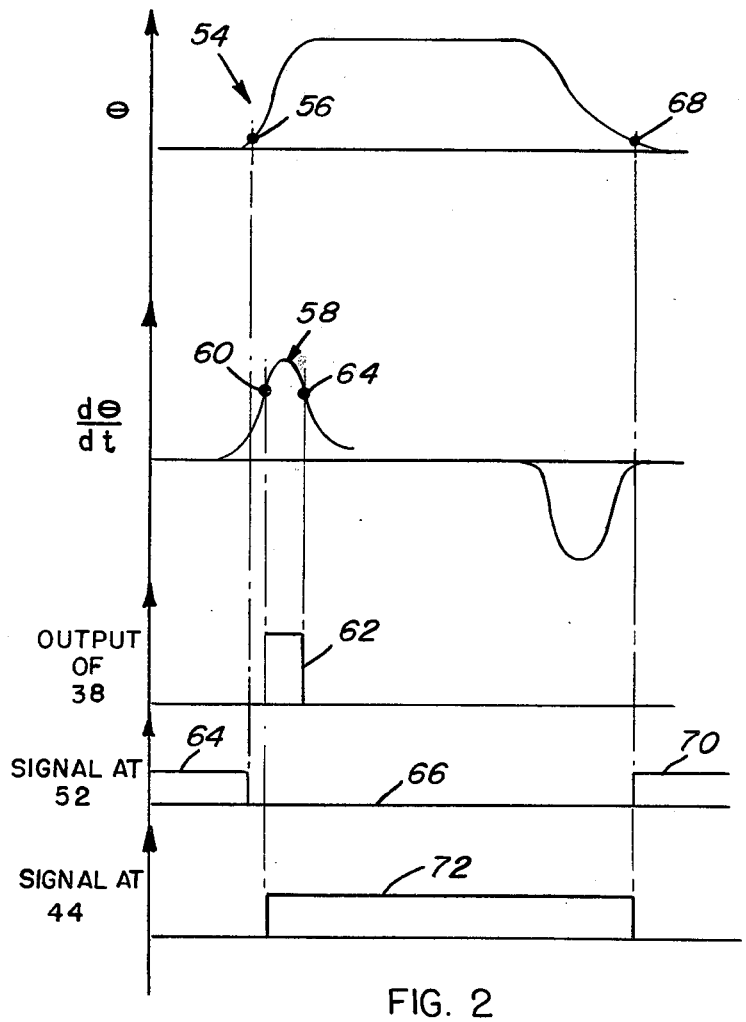
FIG. 2 is a series of timing diagrams relating to the system illustrated in FIG. 1.

Referring to FIG. 2, the timing diagrams for the dynamic situation are shown and will be discussed. The plot for a typical position change of control stick 10 is generally indicated by reference numeral 54. The derivative of the positional plot 54 is indicated by reference numeral 58. A threshold level is preselected and corresponds with points 60 and 64, for driving the Schmitt trigger 38. Thus, when the timing is such that point 60 is reached, the Schmitt trigger 38 is actuated and a binary 1 level occurs, as indicated by reference numeral 62. When point 64 is reached, the threshold for the Schmitt trigger 38 is not being met and therefore the logic level changes to zero for the output of Schmitt trigger 38. However, flip-flop 42 will remain set, as indicated by 72 in FIG. 2. This maintains the inflation of the G-suit 28 until the control stick 10 is returned to a neutral position.

Referring once more to FIG. 1, the angular information derived from potentiometer 14 is also fed to a third Scmitt trigger 48 along input line 46. The Schmitt trigger 48 is responsive to a threshold level of the positional plot 54 (FIG. 2) at points 56 and 68, toward opposite extremes of the plot. An inverter 50 inverts the logic levels from the output of Schmitt trigger 48. The output from the inverter 50 furnishes a reset input at 52 to the flip-flop 42. Thus, referring to FIG. 2, the reset line 52 maintains a binary 1 logic level up to the point that the plot 54 reaches the threshold level, as evidenced by point 56, on the plot. When this threshold point is reached, the Schmitt trigger is actuated and the logic level is inverted by 50 so that the inverted signal from the Schmitt trigger 48 is maintained at a binary 0 value (reference numeral 66) until the second threshold point 68 is reached on the plot 54. When this occurs, the inverted Schmitt trigger output, furnishes a reset along line 52 to the flip-flop 42. This portion of the timing diagram is indicated by reference numeral 70. As will be evidenced, the flip-flop output 72 returns to a binary 0 state when the threshold point 68 of the plot 54 has been arrived at. At this point, the output from the OR gate 22 will be in a binary 0 condition, assuming that the Schmitt trigger 18 is not actuated, and therefore the valve 26 will allow the G-suit to vent.

Although the present invention has been described in one particular embodiment, utilizing electronics, it is to be emphasized that indentical pre-inflation operation of the G-suit 28 may be obtained by utilizing fluidic components. In this case, fluidic analogues are employed to effectuate equivalent functions of the corresponding electronic circuits. In the event that fluidic components are utilized, the valve 26 would be of a different type than the solenoid valve previously discussed. If fluidics were utilized, the valve 26 would be a fluidic interface valve such as manufactured by Northeast Products, Inc. The G-suit 28 would be of the type previously mentioned and inflatible by gas, preferably air.

Accordingly, in view of the aforementioned discussion, the advantages of the present invention, and the novelty thereof will be appreciated.

It should be understood that the invention is not limited to the exact details of construction shown and described herein for obvious modifications will occur to persons skilled in the art.

The following claims include certain claims with breadth intended to cover a fluidic system that is analogous to the electronic system described in the preceding embodiment.

What is claimed is:

1. A system for pre-inflating a G-suit comprising:
    means responsive to positional changes of an aircraft control stick for generating an electrical signal indicative thereof;
    first means connected to the output of the generating means for detecting the presence of an electrical signal, from the generating means, beyond a preselected threshold level; and
    valve means connected to the output of the first threshold detecting means, the valve means assuming a first state when the threshold level is exceeded, thereby inflating a G-suit connected to the valve means, a second state of the valve means being assumed when the output of the first threshold detecting means drops below the preselected threshold level, resulting in the deflation of the G-suit.

2. The subject matter set forth in claim 1 together with means connected to the output of the generating means for differentiating the signal produced by the generating means, the differentiated signal corresponding to the speed of movement of a control stick;
    second threshold detecting means connected to the output of the differentiating means for detecting when the output from the differentiating means exceeds a second preselected threshold level;
    switching means connected to the output of the second threshold detecting means for assuming a first binary state in response to actuation of the second threshold detecting means;
    gating means having a first input connected to the output from the switching means, a second input of the gating means directly connected to the output of the first threshold detecting means, an output of the gating means connected to the valve means for interposing the gating means between the first threshold detecting means and the valve means, causing inflating actuation of the valve means when either input occurs at the gating means; and
    means responsive to the output of the generating means for resetting the switching means in response to a return of a control stick to a neutral position thus changing the state of the valve means to deflate the G-suit.

3. The subject matter set forth in claim 1 wherein the first threshold detecting means is a Schmitt trigger.

4. The subject matter set forth in claim 3 wherein the valve means includes a solenoid activated valve member.

5. The subject matter set forth in claim 4 wherein the second threshold detecting means is a Schmitt trigger.

6. The subject matter set forth in claim 5 wherein the switch resetting means is a Schmitt trigger connected at its input to the output of the generating means, the output of the Schmitt trigger being connected to the input of the switching means through a serially connected inverter.

7. The subject matter set forth in claim 6 wherein the switching means is a flip-flop connected at a reset terminal thereof to the output of the inverter.

8. The subject matter set forth in claim 7 wherein the gating means is an OR gate.

* * * * *